Oct. 21, 1930.  M. T. FORKER  1,778,757
LOCOMOTIVE BOOSTER
Filed March 15, 1928  4 Sheets-Sheet 2

Fig.2.

INVENTOR
Major T. Forker
BY
ATTORNEYS

Oct. 21, 1930.                M. T. FORKER                1,778,757
                            LOCOMOTIVE BOOSTER
                        Filed March 15, 1928        4 Sheets-Sheet 3

INVENTOR
Major T. Forker
BY
ATTORNEYS

Patented Oct. 21, 1930

1,778,757

UNITED STATES PATENT OFFICE

MAJOR T. FORKER, OF LOOMIS, NEW YORK, ASSIGNOR TO FRANKLIN RAILWAY SUPPLY COMPANY, OF NEW YORK, N. Y., A CORPORATION OF DELAWARE

LOCOMOTIVE BOOSTER

Application filed March 15, 1928. Serial No. 261,776.

This invention relates to locomotive boosters, and particularly to reversible booster motors and controlling mechanism therefor.

One of the primary objects of the invention is the improvement and simplification of the construction and operation of reversible boosters and their controlling means.

Another object of the invention is to render more certain the proper operation of the booster, and especially the entrainment and disentrainment thereof.

Still another object of the invention is to protect the booster motor and the entraining mechanism thereof, and particularly to prevent unwanted or premature entrainment of the booster which might result in damage to the parts thereof.

More specifically the invention contemplates the provision of means for positively entraining the booster when desired, for either forward or reverse motion, together with means for preventing untimely entrainment thereof and means for effecting idling of the booster at any time, for example for the purpose of warming it up or clearing its cylinders of condensate, without danger to the booster parts or the entraining gears or associated mechanism.

How I attain the foregoing, together with such other objects and advantages as are incident to the invention or will occur to those skilled in the art, will be evident from the following description, reference being had to the accompanying drawings, in which:

Figure 1:
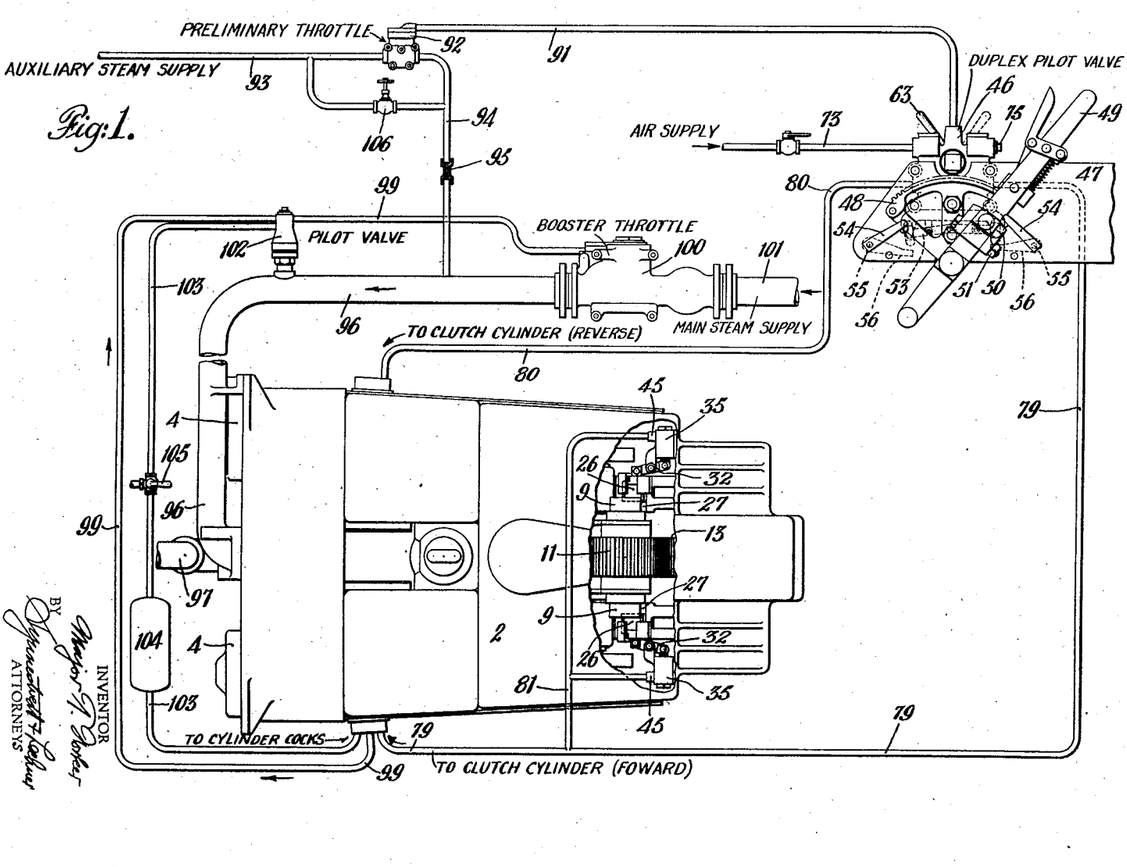
Fig. 1 is a diagrammatic view of a booster motor with its controlling means, embodying my invention, a part of the booster casing being broken away to expose certain parts.
Figure 2:
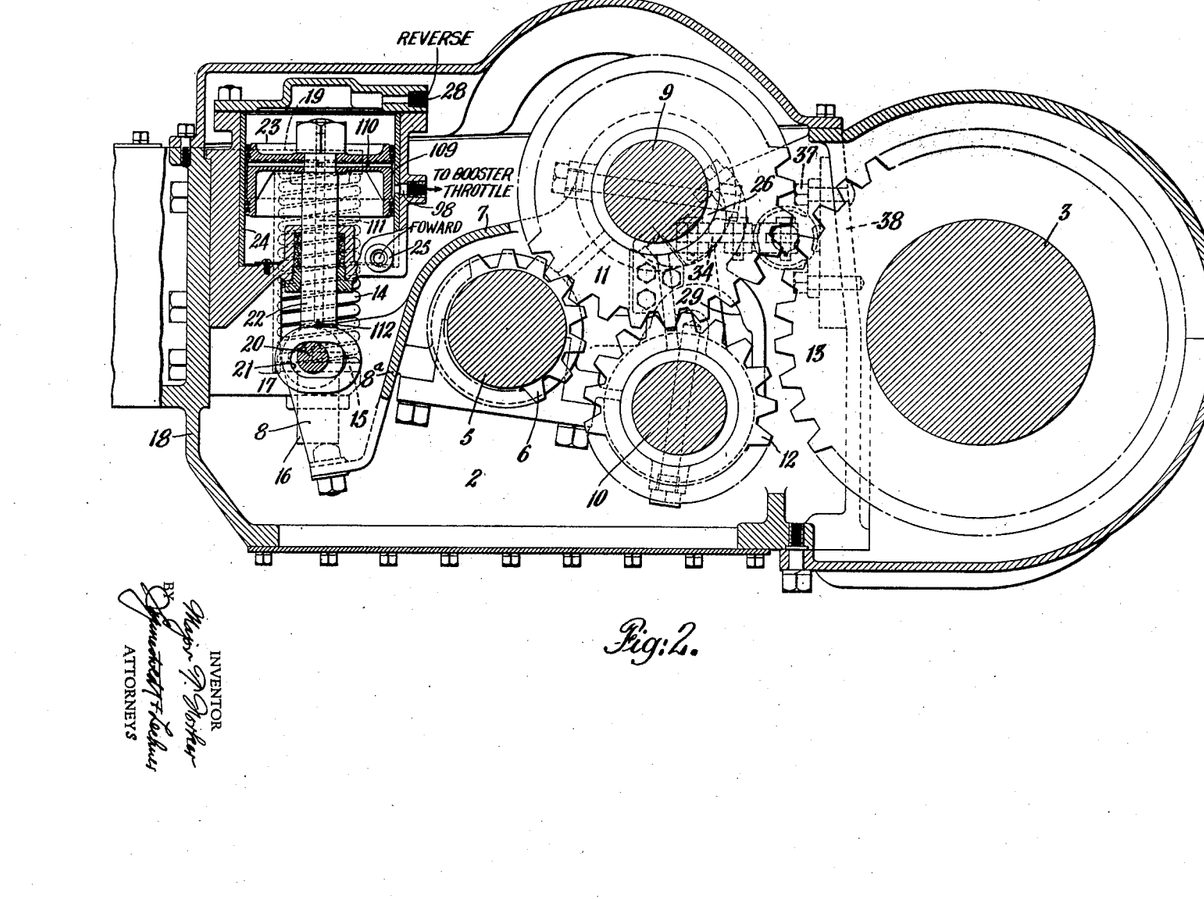
Fig. 2 is an enlarged longitudinal vertical mid-section through a portion of the booster of Fig. 1, with parts shown in elevation.

Referring first to Figs. 1 and 2, it will be seen that I have illustrated a booster motor 2, which may be mounted on a locomotive or other railway vehicle in any suitable manner and is adapted to drive an axle 3 thereof (see Fig. 2) in either forward or reverse motion, as will hereinafter appear. The booster has the usual pair of cylinders 4, 4, the pistons of which, through the usual connecting rods, cranks, etc. (not shown), drive the shaft 5 on which the driving gear or pinion 6 is fixed, the direction of rotation thereof, in this instance, being clockwise when viewed as in Fig. 2.

A rocker 7, pivotally mounted on shaft 5, carries at the back a pair of laterally-spaced actuating arm members 8 (only one of which is here shown), and at the front an upper shaft 9 and a lower shaft 10, the former shaft carrying an idler or pinion 11 constantly in mesh with gear 6, and the latter shaft carrying an idler 12 (for reverse motion) constantly in mesh with gear 11. With the rocker 7 in mid-position, as in Fig. 2, gears 11 and 12 run idle upon operation of the booster; but upon movement of the rocker clockwise the gear 11 is meshed with gear 13 on axle 3 to drive the same for forward motion of the locomotive, and upon counter-clockwise movement of the rocker the gear 12 is meshed with axle gear 13 to drive it for reverse motion of the locomotive.

The lever arm structure 8 of the rocker 7 normally tends to rise, owing to the weight of the pins or shafts 9, 10 and their gears 11, 12, but such tendency is resisted at mid-position of the rocker by the action of compression springs 14 (one on each side of the arm structure 8) each spring bearing down on the head 15 of a pin 16 which is vertically movable in the fixed stop or bracket 17 secured on the inside of the booster casing or housing 18. The upper end of each spring bears against a similar fixed bracket 19. The arms 8 formed preferably integral with the cross-web 8ª of rocker 7, carry between them a pin 20 engaging a slot 21 in the lower end of piston rod 22 which carries the piston 23 operating in the entraining motor cylinder 24.

Figure 3:
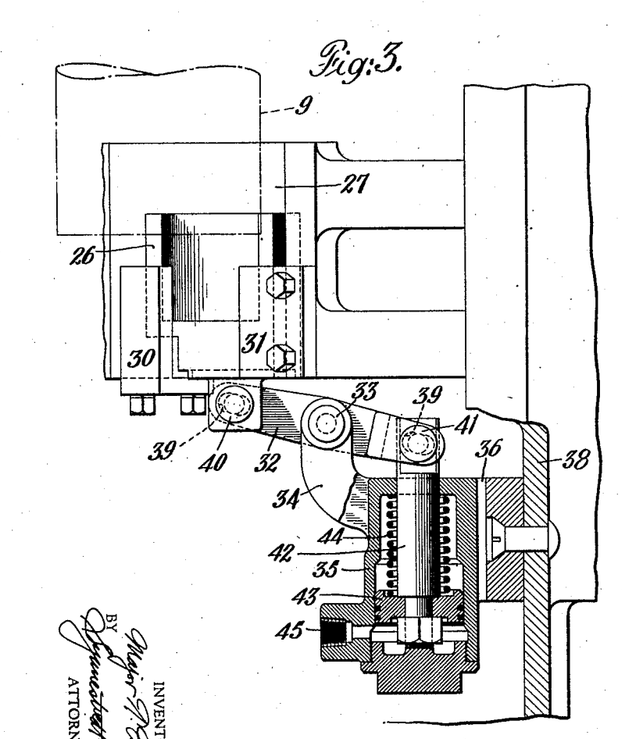
Fig. 3 is an enlarged top plan view, partly in section, of part of the control mechanism of the booster shown in Figs. 1 and 2, namely one of the movable rocker stops with its actuating means.
Figure 4:
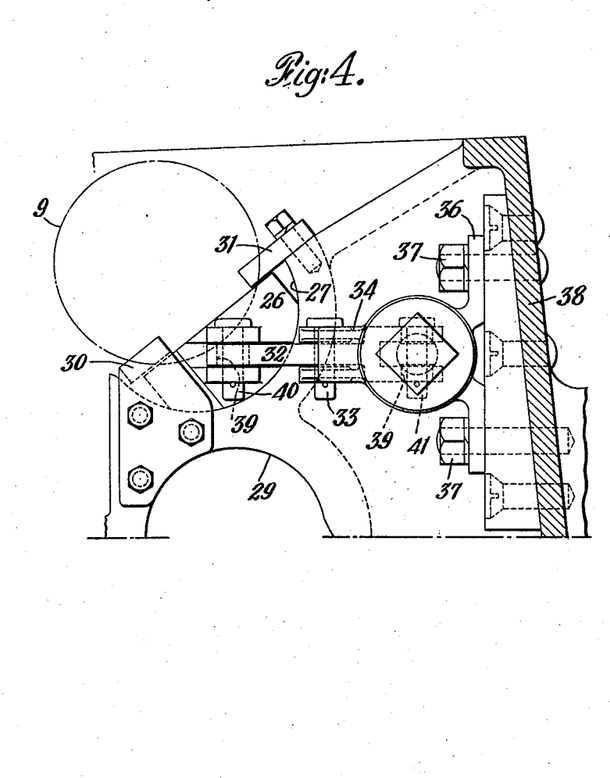
Fig. 4 is a side elevation thereof.

To entrain the booster for forward driving, fluid pressure is admitted (in a manner hereinafter to be described) beneath piston 23, through port 25, causing the piston 23, through its rod 22 and the pin 20, to lift arm 8 (overcoming the pressure exerted by springs 14) and thus move rocker 7 to mesh gear 11 with axle gear 13. At such time, as will further appear hereinafter, the laterally movable rocker stops 26 (shown in Figs. 1 and 3) are moved out of the path of shaft 9, to permit said shaft to move against the fixed stops 27 (see Figs. 1, 3 and 4) these stops being so located that when shaft 9 rests against them the gears 11 and 13 are in proper mesh without binding.

To entrain the booster for reverse movement of the locomotive, fluid pressure is admitted above piston 23 through port 28, causing the piston, through its rod 22 and the pin 20, to move arm 8 downward, thus moving the rocker 7 to mesh gear 12 with axle gear 13. Upon such movement, shaft 10 engages the fixed stops 29, clearly shown in Figs. 2 and 4, thereby properly positioning gears 12 and 13 in mesh without binding.

The movable rocker stops 26, hereinbefore referred to, and shown in Figs, 1 to 4, are located adjacent the ends of shaft 9 which carries gear 11. Each stop 26 is laterally shiftable on the curved surface of fixed stop 27 and is retained or guided by the plates or clips 30, 31. The actuation of the stop is accomplished through a lever 32 fulcrumed by a pin 33 on a fixed member 34 which may conveniently be an arm extending from the stop-actuating cylinder 35, such cylinder being suitably secured by a bracket 36 and bolts 37 to a web or flange 38 of the booster casing. The ends of lever 32, having slotted openings 39, are pivoted respectively by pins 40 and 41 to the stop 26 and to rod 42 connected to piston 43 reciprocable in cylinder 35. Each stop 26 is normally urged inward (to the position shown in Figs. 1 and 3) for engagement with shaft 9, by the force of spring 44; but upon operation of certain controlling mechanism (later to be described) for entrainment of the booster for forward operation of the locomotive, fluid pressure is admitted to each cylinder 35 through its port or inlet 45 to withdraw the stops 26 from the path of shaft 9 as the rocker 7 moves.

Figures 5, 6, 7:
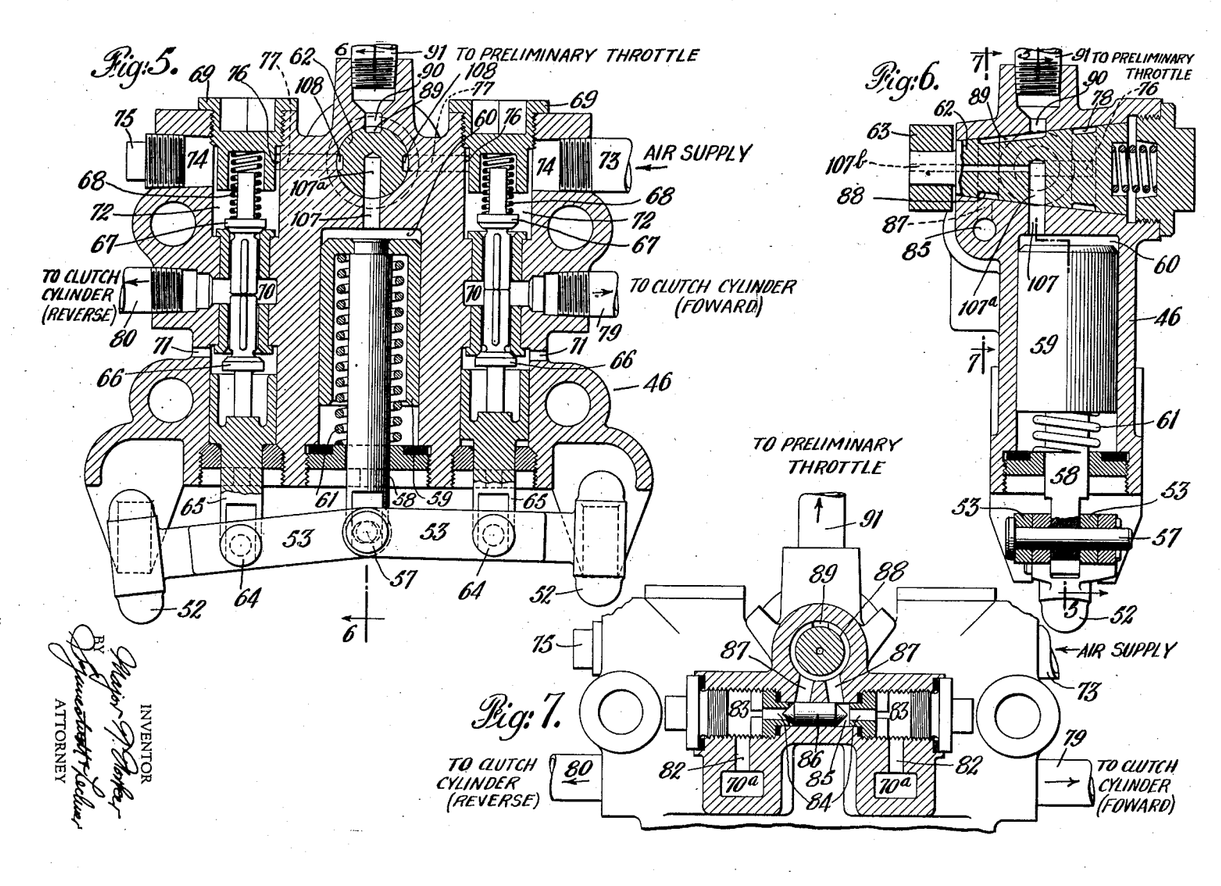
Fig. 5 is a longitudinal vertical sectional view, on the line 5—5 of Fig. 6, through the duplex reverse lever pilot valve employed in the controlling mechanism and shown in Fig. 1.
Fig. 6 is a transverse vertical sectional view of said valve, on the line 6—6 of Fig. 5.
Fig. 7 is a view partly in section and partly in elevation, taken on the line 7—7 of Fig. 6.

Referring now particularly to Figs. 5, 6 and 7, the construction and operation of the pilot valve device 46, as employed in the complete system shown in Fig. 1, will be made clear. This valve, which may be termed a duplex reverse lever pilot valve, is preferably mounted, as on a bracket 47 (see Fig. 1) adjacent the quadrant 48 of the locomotive reverse lever 49, so that, when the booster latch 50, which is pivotally mounted at 51 on said lever, is raised to the position shown, it will, when the reverse lever is "in the corner", engage the head 52 of one of the pilot valve operating arms 53, or, in installations where valve 46 and quadrant 48 are mounted on opposite sides of bracket 47 (as they are illustrated in Fig. 1) it (the booster latch) will engage a rocking arm 54 fixed at one end on a short shaft 55 which carries a second arm 56 adapted to engage and lift the head 52 of one of the operating arms 53 of the pilot valve.

The operating or actuating arms 53 of the duplex valve are each pivoted at one end by a pin 57 to a stem 58 of a piston 59, which operates in a cylinder or chamber 60 formed in the body of the valve and is normally held in raised position (as shown in Figs. 5 and 6) by a spring 61 except when the idling valve 62, hereinafter to be described, is operated by its handle 63 to idle the booster. Each arm or lever 53, intermediate its ends, is pivoted at 64 to a stem 65 which is adapted to raise a valve 66 and a valve 67, against the pressure of a spring 68 seated inside a removable cap 69.

Valves 66 are each adapted to control the passage of fluid from a chamber 70 to an exhaust passage 71 open to atmosphere, and these valves are normally open when the booster is not in operation, i. e. when stems 65 are not raised by the operating levers 53. Valves 67 each control the passage of fluid from a chamber 72 to the corresponding chamber 70, and are normally closed when the booster is not in operation.

Fluid under pressure, for the operation of the control system, such as air from the main air reservoir on the engine, is admitted through pipe 73 to either the right or left inlet 74, whichever is most convenient for making the connection, the other inlet 74 being closed as by a plug 75. Each inlet 74 is connected to a chamber 72, and the two chambers have constant intercommunication through transverse passages 76 (see Fig. 6), longitudinal passages 77 (see Fig. 5), and the circumferential groove 78 of valve 62.

As will be seen from Fig. 5, the right-hand chamber 70 has a pipe 79 leading from it, and the left-hand chamber has a pipe 80 leading from it. These pipes are to convey fluid pressure, when the booster is to be entrained, to the booster clutch cylinder 24, and in this particular case pipe 80 is for reverse and therefore leads to inlet 28 of said cylinder, while pipe 79 is for forward motion and is therefore connected to inlet 25 of the cylinder. A branch connection 81, (see Fig. 1) from pipe 79, admits fluid pressure to the inlets 45 of the cylinders 35 for withdrawing the safety rocker-stops 26 upon forward operation of the booster.

Referring again to Figs. 5 to 7, the chambers 70 each communicate by a transverse passage 70ª (Fig. 7) and a vertical passage 82 to a chamber 83. The two chambers 83, in turn, by passages 84 communicate with a small cylindrical chamber 85, in which is a sliding plug 86 acting as a double check valve for said passages. When pressure has been admitted into one chamber 83 it moves the check valve 86 to close the opposite port 84 and one of the passages 87. The other of these passages 87 (both of which lead to the annular groove 88 of valve 62) permits the fluid to enter the groove 88 which latter communicates with the groove 89 (see Fig. 6). This groove 89 runs longitudinally along the surface of valve 62, and, when the valve is in the position shown, communicates with outlet 90 to which is connected a pipe 91 leading to the preliminary throttle valve 92 of the booster. Such throttle valve (indicated in Fig. 1 in diagrammatic form only, since it is well known in the art) then permits steam from any suitable source, to flow from pipe 93, through pipe 94, in which there may be a choke 95 to prevent overspeeding of the booster during preliminary operation, into pipe 96 leading to the booster cylinders to cause slow running of the motor while the gears are being entrained. The exhaust pipe from the booster is indicated at 97.

As the piston 23, in the booster entraining or booster clutch cylinder 24, moves to cause entrainment, the outlet 98 (of said cylinder) is put into communication with the space below or above said piston (depending upon whether the booster is being entrained for forward or reverse motion of the locomotive) and fluid pressure passes from said outlet, through pipe 99 (see Fig. 1) to the main booster throttle 100 which is thereupon opened (in a manner well understood in this art) to admit steam from the main booster supply pipe 101 to pipe 96 and thence to the motor.

The booster motor 2 is equipped with cylinder cocks (not shown, but well known in the art) which are normally open to atmosphere when the booster is not in operation, so that when the booster is idled, either for warming it up or for purposes of entrainment, any water of condensation in the cylinders will be blown out through said cocks. The cylinder cock arrangement shown in the co-pending application of F. R. Peters, Serial No. 204,509, may well be used; and for the closing of said cocks upon delivery of full steam pressure to the booster cylinders through pipe 96, I employ mechanism similar to that shown in said application. Such mechanism, which I have illustrated in Fig. 1, includes a pilot valve 102 which is tapped into pipe 99 and steam delivery pipe 96. When the fluid pressure in pipe 99 has opened the main booster throttle 100, which occurs, as hereinbefore pointed out, upon full entrainment of the booster gears, the steam pressure in pipe 96 becomes great enough to operate the pilot valve 102, which thereupon admits fluid pressure from pipe 99 to pipe 103 leading to the cylinder cocks for closing the same. A timing reservoir 104 may be inserted in pipe line 103 to delay the closing of said cocks until the booster is in full operation, and a manual cut-out cock 105 may also be provided for shutting off the fluid supply in pipe 103 so as to keep the cylinder cocks open for any length of time desired. For warming the booster cylinders when the booster is disentrained a manually-operable needle valve 106 may be provided to by-pass a small quantity of steam around the preliminary throttle, from pipe 93 to pipe 94.

Returning now to the idling valve 62 embodied in the duplex pilot valve 46, it will be seen that this valve, in addition to its peripheral grooves 78 and 88 and groove 89, all hereinbefore referred to, has a passage 107ª, 107ᵇ, adapted to communicate (with the valve in the position shown) at one end with chamber 60 through port 107, and at the other end with the atmosphere, thus forming a complete exhaust passage for said chamber when spring 61 raises piston 59. Valve 62 has, in addition, two longitudinal grooves 108, each communicating at one end with the annular groove 78, and terminating at the other end at a point in the plane of ports 90 and 107. It will now be seen that if valve 62, by its handle 63, be turned through 90° from the position shown in Figs. 5 to 7 (so that its handle is positioned as shown in dotted lines in Fig 1) port 107 will be cut off from exhaust passage 107ª, 107ᵇ, and put in communication, through one of the grooves 108, with the groove 78 and thence with passages 77 and 76 and chambers 72, in which air pressure from pipe 73 is always present. The air will force piston 59 down, thus lowering pivot 57 and raising the heads 52 of the pilot valve arms 53 out of the path of levers 56 so that the booster cannot be entrained by raising booster latch 50.

At the same time, air from groove 78 will pass through the other longitudinal groove 108 which is then in communication with port 90, and will pass through pipe 91 to the preliminary throttle 92 to open the same and cause idling of the booster. Therefore it is obvious that the booster may be idled at any time, by merely throwing valve handle 63, even with the reverse lever 49 down in the corner (and even with latch 50 left by inadvertence in raised position) and regardless of the speed of the locomotive or its direction of operation, and this without any risk of having the booster entrained under such conditions as to cause clashing of the gears or damage to the mechanism.

To complete the description of the apparatus the following details might be pointed out:

Piston 23, in the entraining or clutch cylinder, is equipped with an annular portion of reduced diameter, providing a channel 109, communicating through passages 110 with a vertical passage 111 in the piston rod 22 which in turn has ports 112 to atmosphere. This provides for the exhausting of air pressure from pipe line 99 and consequently the closing of the main booster throttle 100 upon disentrainment of the booster after operation in either direction.

Furthermore, upon disentrainment of the booster after operation in either direction, the air in line 91 (which holds the preliminary throttle 92 open) is discharged through valve 62 (by passage 89, and 88) and thence through one of the passages 87 (whichever at the time is not covered by check valve 86) chamber 85, port 84, chamber 83, ports 82 and 70$^a$, chamber 70, valve 66 and port 71 to the atmosphere.

Upon disentrainment of the booster after forward operation, the air beneath piston 23, and in pipe line 79 is exhausted to atmosphere through chamber 70, valve 66 and port 71 of the duplex pilot valve. The air in movable rocker stop operating cylinders 35 is at the same time exhausted through pipe 81 and pipe 79, thus permitting the springs 44 to return the movable stops 26 to the position shown in Fig. 3 to prevent unwanted entrainment of gears 11 and 13 either by gravity or by failure of the positioning springs 14 of the rocker 7. Upon disentrainment of the booster after reverse operation, the air above clutch piston 23 is exhausted through pipe 80, chamber 70 to which said pipe connects, valve 66 and port 71. No safety rocker stops are here necessary since there is no natural tendency of gravity to entrain gears 12 and 13.

The plug check valve 86, hereinbefore referred to, upon admission of pressure through the right hand ports 84, 87 (Fig. 7) passages 88, 89, and pipe 91 to the preliminary throttle at the time when air is passing through pipe 79 for forward entrainment of the booster, obviously prevents air from by-passing from passage 88 through left-hand ports 87 and 84, etc. to pipe 80 (which leads to cylinder 24 for reverse entrainment). This operation of check valve 86 is of course exactly reversed when the booster is being entrained for reverse operation.

In brief, the operation of the entire mechanism will now be seen to be as follows:

When the locomotive reverse lever 49 is in or near the corner (as it ordinarily is at starting or in slow heavy pulling) if booster latch 50 be raised, the respective exhaust valve 66 (depending upon whether the locomotive is in forward or reverse) will be closed and valve 67 opened by the raising of head 52 of the respective actuating arm 53 of the pilot valve. Assuming now that the operation is forward, air (or other fluid under pressure) from supply pipe 73 will flow from right-hand chamber 72 (Fig. 5) through open valve 67 to chamber 70, and from thence through pipe 79 to booster clutch cylinder inlet 25 to raise piston 23 for entrainment of gears 11 and 13; a part of the air in pipe 79 acting through branch pipe 81, which leads to inlets 45 of movable rocker stop operating cylinders 35, to move piston 43 and withdraw the safety rocker stops 26 from the path of movement of the shaft 9. At the same time, air-pressure from chamber 70 is passing through ports 70$^a$, 82, chamber 83, port 84, chamber 85, past valve 86, through port 87 to groove 88, and thence along groove 89 through outlet 90 and pipe 91 to the preliminary booster throttle 92, to permit steam to flow from pipe 93 through pipes 94 and 96 to the cylinders to idle the booster while the gears are being entrained.

As the entraining piston 23 reaches the end of its upward stroke, port or outlet 98 is uncovered and air flows from cylinder 24 through said port and pipe 91 to the main booster throttle 100, which opens to admit full steam pressure from pipe 101 to pipe 96 leading to the booster cylinders. As the pressure builds up in pipe 96 it operates pilot valve 102 to permit air from line 99 to flow through pipe 103 and timing reservoir 104 to the cylinder cocks (not shown) to close them after the booster has attained its full operation.

By lowering latch 50, or by hooking-back the reverse lever 49 (which is progressively done as the locomotive gains speed), the head 52 of arm 53 is disengaged, and spring 68 (as well as the air pressure) closes valve 67 and opens valve 66. This cuts off the air supply from the booster controlling and entraining mechanism, and permits the air in the system to be exhausted through port 71 of the pilot valve, and through the exhaust port formed of the passages 109, 110, 111 and 112 of the clutch piston and rod (the latter exhaust causing closure of the main booster throttle).

For reverse operation of the booster, the parts are similarly actuated except that the opposite side of the duplex pilot valve (the left side, as shown in Fig. 5) comes into play, and that the gears 12 and 13 are meshed. Also, as previously stated, there are no safety rocker stops to be moved upon reverse entrainment, such stops being unnecessary since the whole tendency of gravity is to throw the booster into forward entrainment, upon any failure of the mechanism which holds the rocker in mid-position.

For idling the booster without entrainment the idling valve 62 (of the duplex pilot valve) is moved through a quarter turn from its position in Fig. 5, causing a flow of air-pressure, as before mentioned, from annular groove 78 (which is in constant communication with chambers 72) through the two grooves 108. One of these delivers air through port 107 to cylinder 60 to depress plunger 58 and raise heads 52, so as to positively prevent entrainment of the booster under any circumstances, while the other delivers air through port 90 and pipe 91 to the preliminary booster throttle to idle the booster.

What I claim is:—

1. A locomotive booster device including a booster motor, entraining means therefor, actuating means for said entraining means, stop means normally preventing entrainment, and means rendering said stop means ineffective upon operation of said actuating means.

2. In combination with a booster motor, a controlling system including entraining means, means yieldingly resisting entrainment, and stop means positively preventing entrainment, said stop means being disabled upon operation of the controlling system to entrain the booster.

3. The combination of a railway vehicle axle, a booster, a shiftable gear for entraining the booster with the axle, stop means normally preventing such entrainment, and means for rendering said stop means ineffective and for shifting said gear to entrain the booster.

4. In a locomotive booster, shiftable entraining means, a stop limiting the movement thereof, and additional stop means normally further limiting said movement, with means for shifting said additional stop means.

5. In a locomotive booster, shiftable entraining means tending by gravity toward entrainment, means normally holding said means out of entrainment, means for shifting it into entrainment, and stop means normally positively preventing entrainment even upon failure of the holding means but movable to inoperative position to permit entrainment upon operation of said shifting means.

6. In a locomotive booster, shiftable entraining means tending by gravity toward entrainment, means normally holding said means out of entrainment, means for shifting it into entrainment, and stop means normally positively preventing entrainment even upon failure of the holding means but movable to inoperative position to permit entrainment upon operation of said shifting means, together with fixed stop means positioning the entraining means upon entrainment.

7. In combination with a booster motor, entraining means shiftable into forward or reverse entrainment, means yieldingly acting thereon to hold it in mid-position, means for shifting it into forward or reverse positions, and movable stop means preventing its movement to one of said positions except upon operation of said shifting means to move it toward that position.

8. In combination with a booster motor, entraining means shiftable into forward or reverse entrainment, means yieldingly acting thereon to hold it in mid-position, means for shifting it into forward or reverse positions, and movable stop means preventing its movement to one of said positions except upon operation of said shifting means to move it toward that position, together with fixed stops positioning it when in full entrainment.

9. In combination with a booster motor and a pneumatic control system therefor, a shifting entraining mechanism, a movable stop device therefor, and means influenced by the operation of the control system in entraining the booster to move said stop device and render it ineffective.

10. In combination with a booster motor and a pneumatic control system therefor, a shiftable entraining mechanism, a pilot valve device adapted upon operation to admit fluid-pressure to said system for entraining and operating the booster, and means for idling the booster including a valve and adapted upon operation to prevent operation of the pilot valve for entrainment of the booster.

11. In combination with a booster and its entraining, idling, and operating means, fluid-pressure-releasable stop means normally preventing entrainment, and a pilot valve having means whereby said stop means are released and said entraining idling, and operating means are actuated.

12. In combination with a booster and its entraining, idling, and operating means, fluid-pressure-releasable stop means normally preventing entrainment, and a pilot valve having means whereby said stop means are released and said entraining, idling, and operating means are actuated, together with independent idling means associated with said pilot valve and adapted, when operated, to render said pilot valve inoperative.

13. In combination with a booster and its entraining, idling, and operating means, fluid-pressure-releasable stop means normally preventing entrainment, and a pilot valve having means whereby said stop means are released and said entraining, idling, and operating means are actuated, together with independent idling means associated with said pilot valve and having fluid-pressure-actuated means, operable, when said idling means is operated, to render said pilot valve inoperative.

14. A duplex booster-controlling pilot valve device including forward and reverse actuating members having a common pivot axis, valves operable independently by each, means for admitting fluid-pressure to said valves, and a chamber and an outlet therefrom for each valve, controlled by said valve, whereby fluid pressure may be delivered respectively to the forward and reverse actuating lines of the booster, and means for moving said pivot axis to render said actuating members inoperative.

15. A duplex booster-controlling pilot valve device including forward and reverse actuating members, having a common pivot axis, valves operable independently by each, means for admitting fluid-pressure to said valves, and a chamber and an outlet therefrom for each valve, controlled by said valve, whereby fluid pressure may be delivered respectively to the forward and reverse actuating lines of the booster, together with an exhaust valve for each chamber each associated with one of the other valves whereby, upon closure thereof the exhaust valve opens to exhaust the respective actuating line, and means for moving said pivot axis to render said actuating members inoperative.

16. A duplex booster-controlling pilot valve device including forward and reverse actuating members, valves operable independently by each, means for admitting fluid-pressure to said valves, and a chamber and an outlet therefrom for each valve, controlled by said valve, whereby fluid pressure may be delivered respectively to the forward and reverse actuating lines of the booster, together with a third outlet to which an actuating line to a booster throttle may be connected, and a communicating system from each chamber to said third outlet with means closing one system when fluid-pressure is admitted to the other.

17. A duplex booster-controlling pilot valve device including forward and reverse actuating members, valves operable independently by each, means for admitting fluid-pressure to said valves, and a chamber and an outlet therefrom for each valve, controlled by said valve, whereby fluid pressure may be delivered respectively to the forward and reverse actuating lines of the booster, together with a third outlet to which an actuating line to a booster throttle may be connected, and a communicating system from each chamber to said third outlet with means closing one system when fluid-pressure is admitted to the other comprising a chamber through which both systems lead and a double-acting check-valve in said chamber.

18. A duplex booster-controlling pilot valve device including forward and reverse actuating members, valves operable independently by each, means for admitting fluid-pressure to said valves, and a chamber and an outlet therefrom for each valve, controlled by said valve, whereby fluid pressure may be delivered respectively to the forward and reverse actuating lines of the booster, together with a common pivot for said actuating members, an independently operable idling valve, and means actuated upon operation thereof to shift said pivot.

19. A duplex booster-controlling pilot valve device including forward and reverse actuating members, valves operable independently by each, means for admitting fluid-pressure to said valves, and a chamber and an outlet therefrom for each valve, controlled by said valve, whereby fluid pressure may be delivered respectively to the forward and reverse actuating lines of the booster, together with a common pivot for said actuating members, an independently operable idling valve, and means actuated upon operation thereof to shift said pivot, said means including a cylinder having a piston connected to the pivot and a fluid-pressure-conducting system connected to said cylinder and controlled by said idling valve.

20. A booster-controlling pilot valve device for use with a pneumatic controlling system, including a pivoted actuating member, valve means operable thereby to control the delivery of fluid-pressure to the system, an independently operable idling valve having an outlet adapted to deliver fluid-pressure to a booster throttle, and means operable upon the actuation of said independent valve to render said actuating member inoperative.

21. A booster-controlling pilot valve device for use with a pneumatic controlling system, including a pivoted actuating member, valve means operable thereby to control the delivery of fluid-pressure to the system, an independently operable idling valve having an outlet adapted to deliver fluid-pressure to a booster throttle, and means operable upon the actuation of said independent valve to shift the pivot of said actuating member.

22. A booster-controlling pilot valve device for use with a pneumatic controlling system, including a pivoted actuating member, valve means operable thereby to control the delivery of fluid-pressure to the system, an independently operable idling valve having an outlet adapted to deliver fluid-pressure to a booster throttle, and means operable upon the actuation of said independent valve to shift the pivot of said actuating member, said means comprising a cylinder having a piston therein connected to said pivot, an inlet to said cylinder, and a fluid-delivery port in said valve adapted to register with said inlet upon movement of the valve to idling position.

23. A booster-controlling pilot valve device for use with a pneumatic controlling system, including a pivoted actuating member, valve means operable thereby to control the delivery of fluid-pressure to the system, an independently operable idling valve having two systems of passages and having an outlet adapted to deliver fluid-pressure to a booster throttle, and fluid-pressure-actuated means for shifting the pivot of the actuating member, one of said systems of passages being adapted when the idling valve is in one position to permit fluid-pressure to flow from the control valve means to the idling valve outlet, and the other of said systems being adapted when the idling valve is in another position to permit fluid flow to said outlet and to said fluid-pressure-actuated means to shift the pivot of the actuating member.

24. In combination, a booster motor, a fluid-pressure operated controlling system therefor, a double-acting entraining motor for entraining the booster either for forward or reverse drive under the influence of said system and having a cylinder and piston normally in mid-position relative to each other, and means controlled by said cylinder and piston upon entraining movement in either direction to admit pressure fluid from one part of the controlling system to another, together with exhaust means in said piston adapted to exhaust pressure fluid from said latter part of the system upon return of the motor to normal mid-position.

25. A booster-controlling pilot valve device for use with a pneumatic controlling system, including a movable actuating member, valve means operable thereby to control the delivery of fluid-pressure to the system, an independently operable idling valve having an outlet adapted to deliver fluid-pressure to a booster throttle, and means operable upon the actuation of said independent valve to render said actuating member inoperative.

26. A booster-controlling pilot valve device for use with a pneumatic controlling system, including a movable actuating member, valve means operable thereby to control the delivery of fluid-pressure to the system, an independently operable idling valve having two systems of passages and having an outlet adapted to deliver fluid-pressure to a booster throttle, and fluid-pressure-actuated means for moving the actuating member, one of said systems of passages being adapted when the idling valve is in one position to permit fluid-pressure to flow from the control valve means to the idling valve outlet, and the other of said systems being adapted when the idling valve is in another position to permit fluid flow to said outlet and to said fluid-pressure-actuated means to move and thereby disable the actuating member.

27. In reversible booster apparatus for locomotives, a pilot valve body with forward and reverse valve mechanisms therein, a fluid-pressure inlet communicating in the body with both of said mechanisms, a plurality of outlets from the body controlled by said mechanisms, and actuating members for each of said mechanisms associated with said body.

28. In reversible booster apparatus for locomotives, a pilot valve body with forward and reverse valve mechanisms therein, a fluid-pressure inlet communicating in the body with both of said mechanisms, a plurality of outlets from the body controlled by said mechanisms, and actuating members for each of said mechanisms associated with said body and mounted opposite one another so as to be alternatively operated by a single member on the locomotive reversing gear according as to whether such gear is in forward or reverse position.

29. In reversible booster apparatus for locomotives, a pilot valve body with forward and reverse valve mechanisms therein, a fluid-pressure inlet communicating in the body with both of said mechanisms, a plurality of outlets from the body controlled by said mechanisms, and actuating members for each of said mechanisms associated with said body, together with a common mounting for said members.

30. In reversible booster apparatus for locomotives, a pilot valve body with forward and reverse valve mechanisms therein, a plurality of outlets from the body controlled by said mechanisms, and actuating members for each of said mechanisms associated with said body, together with a common movable mounting for said members, whereby they may be moved to an inoperative position.

31. In reversible booster apparatus for locomotives, a pilot valve body with forward and reverse valve mechanisms therein, a plurality of outlets from the body controlled by said mechanisms, and actuating members for each of said mechanisms associated with said body, together with a common movable mounting for said members, whereby they may be moved to an inoperative position, and an independent booster idling valve in the body.

32. In reversible booster apparatus for locomotives, a pilot valve body with forward and reverse valve mechanisms therein, a plurality of outlets from the body controlled by said mechanisms, and actuating members for each of said mechanisms associated with said body, together with a common movable mounting for said members, whereby they may be moved to an inoperative position, and an independent booster idling valve in the body having means for moving said mounting when thrown into idling position.

33. In reversible booster apparatus for locomotives, a pilot valve body with forward and reverse valve mechanisms therein, a plurality of outlets from the body controlled by said mechanisms, and actuating members for each of said mechanisms associated with said body, together with a common movable mounting for said members, whereby they may be moved to an inoperative position, and an independent booster idling valve in the body having means for moving said mounting when thrown into idling position, said idling valve, movable mounting and means for moving it being positioned intermediate the forward and reverse valve mechanisms and their outlets.

In testimony whereof I have hereunto signed my name.

MAJOR T. FORKER.